United States Patent
Shin

(10) Patent No.: US 10,224,575 B2
(45) Date of Patent: Mar. 5, 2019

(54) METHOD OF CONTROLLING DIFFERENT KINDS OF BATTERY CELLS AND ELECTRONIC DEVICE FOR SAME

(71) Applicant: Samsung Electronics Co., Ltd., Suwon-si (KR)

(72) Inventor: Young-Chul Shin, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 465 days.

(21) Appl. No.: 14/943,724

(22) Filed: Nov. 17, 2015

(65) Prior Publication Data

US 2016/0141730 A1 May 19, 2016

(30) Foreign Application Priority Data

Nov. 17, 2014 (KR) .................. 10-2014-0160217

(51) Int. Cl.
- *H01M 10/42* (2006.01)
- *H01M 10/48* (2006.01)
- *H01M 2/10* (2006.01)
- *H01M 10/052* (2010.01)
- *H01M 10/30* (2006.01)
- *H01M 10/34* (2006.01)

(52) U.S. Cl.
CPC ..... *H01M 10/4207* (2013.01); *H01M 2/1022* (2013.01); *H01M 10/425* (2013.01); *H01M 10/482* (2013.01); *H01M 10/052* (2013.01); *H01M 10/30* (2013.01); *H01M 10/345* (2013.01); *H01M 2010/4271* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 7,279,867 | B2 * | 10/2007 | Benckenstein, Jr. | H02J 7/0016 320/112 |
| 7,554,290 | B2 * | 6/2009 | Johnson | H01M 2/1055 320/112 |
| 2014/0154554 | A1 | 6/2014 | Kim et al. | |

* cited by examiner

*Primary Examiner* — Sarah A. Slifka
(74) *Attorney, Agent, or Firm* — McAndrews, Held & Malloy, Ltd.

(57) ABSTRACT

In accordance with an embodiment of a disclosure, a battery pack is disclosed that includes a first battery cell of a first battery type, a second battery cell of a second battery type, a sensor enabled to measure a current and/or a voltage of the first battery cell and/or the second battery cell, a controller enabled to compare a measured current with a current threshold and/or a measured voltage with a voltage threshold, and a switching circuit enabled to connect to the controller one of the first battery cell and the second battery cell, based on a result of the comparison.

20 Claims, 11 Drawing Sheets

METHOD OF CONTROLLING DIFFERENT KINDS OF BATTERY CELLS AND ELECTRONIC DEVICE FOR SAME

RELATED APPLICATION(S)

This application claims priority under 35 U.S.C. § 119(a) to Korean Application Serial No. 10-2014-0160217, which was filed in the Korean Intellectual Property Office on Nov. 17, 2014, the entire content of which is hereby incorporated by reference.

BACKGROUND

The present disclosure relates to an electronic device, and more particularly, to an electronic device controlling different kinds of battery cells.

A battery is necessary for supplying power to a mobile electronic device such as a smart phone, a tablet PC, etc., which is commonly used at present. In general, the battery includes a rechargeable secondary cell. The types of secondary cell may include a nickel-cadmium (Ni—Cd) cell, a nickel-metal hydride (Ni-MH) cell, a lead acid cell, a lithium-ion (Li-ion) cell, a lithium-polymer (Li—Po) cell, etc.

In general, a battery pack may consist of one or more cells. Typically, even though a plurality of battery cells exists within the battery pack, the battery pack may generally consist of a single type of battery cell. For example, a tablet PC may use three Li-ion battery cells connected in parallel in one battery pack.

SUMMARY

A conventional battery pack generally consists of a single type of battery cell. However, the various types of battery cells may have different characteristics. A battery pack with different types of batteries where each battery may comprise one or more cells may be able to take advantage of the various characteristics of the different types of battery cells.

An embodiment of the present disclosure may provide a method and an apparatus for controlling different types of battery cells.

Another embodiment of the present disclosure may provide a method and an apparatus for controlling different types of battery cells when the battery cells are discharged.

Another embodiment of the present disclosure may provide a method and an apparatus for controlling different types of battery cells when the battery cells are charged.

Another embodiment of the present disclosure may provide a method and an apparatus for configuring a connection by another type of a battery cell based on a discharge current of the battery cell when a particular battery cell is discharged.

Another embodiment of the present disclosure may provide a method and an apparatus for configuring a connection by another type of a battery cell based on a charge current of the battery cell when a particular battery cell is charged.

In accordance with an embodiment of a disclosure, a battery pack is disclosed that includes a first battery cell of a first battery type, a second battery cell of a second battery type, a sensor enabled to measure a current and/or a voltage of the first battery cell and/or the second battery cell, a controller enabled to compare a measured current with a current threshold and/or a measured voltage with a voltage threshold, and a switching circuit enabled to connect to the controller one of the first battery cell and the second battery cell, based on a result of the comparison.

When the first battery cell is connected to the controller and the measured current to or from the first battery cell is larger than or equal to the current threshold, the switching circuit may terminate the connection between the first battery cell and the controller. The switching circuit may then connect the second battery cell with the controller.

When the second battery cell is connected to the controller and the measured current to or from the second battery cell is smaller than the current threshold, the switching circuit may terminate the connection between the second battery cell and the controller. The switching circuit may then connect the first battery cell with the controller.

When the second battery cell is connected to the controller and the measured voltage of the second battery cell is smaller than the voltage threshold, the switching circuit may terminate the connection between the second battery cell and the controller. The switching circuit may then connect the first battery cell with the controller. When the first battery cell is connected to the controller and the measured voltage of the first battery cell is smaller than the voltage threshold, the controller may determine that the first battery cell and the second battery cell need to be charged.

When the first battery cell is connected to the controller and the measured voltage of the first battery cell is smaller than a second threshold, the switching circuit may terminate the connection between the controller and the first battery cell. The switching circuit may then connect the second battery cell with the controller. When the second battery cell is connected to the controller and when the measured voltage of the second battery cell is smaller than the voltage threshold, the controller may determine that the first battery cell and the second battery cell need to be charged.

When the measured voltage of the first battery cell is larger than or equal to the voltage threshold the controller may determine that the first battery cell is completely charged.

When the measured voltage of the second battery cell is larger than or equal to the voltage threshold the controller may determine that the second battery cell is completely charged.

The first battery cell and the second battery cell may each be one of a Ni—Cd battery type, a Ni-MH battery type, a lead acid battery type, a Li-ion battery type, a Li—Po battery type, and a Li—FePO4 battery type, where the first battery cell and the second battery cell are different types.

Various embodiments of the disclosure may describe a method to measure a current and/or a voltage of a first battery cell of a first battery type and/or a second battery cell of a second battery type, where the battery pack may comprise the first battery cell, the second battery cell, and a controller. The controller may compare a measured current with a current threshold and/or compare a measured voltage with a voltage threshold. Based on the result of the comparison, the first batter cell or the second battery cell may be connected to the controller.

When the first battery cell is connected to the controller and the measured current to or from the first battery cell is larger than or equal to the current threshold, the connection between the first battery cell and the controller may be terminated. The second battery cell may then be connected with the controller.

When the second battery cell is connected to the controller and the measured current to or from the second battery cell is smaller than the first current threshold, the connection between the second battery cell and the controller may be terminated. The first battery cell may then be connected with the controller.

When the second battery cell is connected to the controller and the measured voltage of the second battery cell is smaller than the voltage threshold, the connection between the second battery cell and the controller may be terminated. The first battery cell may then be connected with the controller. When the first battery cell is connected to the controller and the measured voltage of the first battery cell is smaller than the voltage threshold, the controller may be determine that the first battery cell and the second battery cell need to be charged.

When the first battery cell is connected to the controller and the measured voltage of the first battery cell is smaller than the voltage threshold, the connection between the controller and the first battery cell may be terminated. The second battery cell may then be connected with the controller. When the second battery cell is connected to the controller and the measured voltage of the second battery cell is smaller than the voltage threshold, the controller may determine that the first battery cell and the second battery cell need to be charged.

When a measured voltage of the first battery cell is larger than or equal to the voltage threshold, the controller may determine that the first battery cell is completely charged.

When a measured voltage of the second battery cell is larger than or equal to the voltage threshold, the controller may determine that the second battery cell is completely charged.

The first battery cell and the second battery cell may each be one of a Ni—Cd battery type, a Ni-MH battery type, a lead acid battery type, a Li-ion battery type, a Li—Po battery type, and a Li—FePO4 battery type, where the first battery cell and the second battery cell are different types.

A battery pack may comprise a first battery comprising a plurality of battery cells of a first type, a second battery comprising a plurality of battery cells of a second type, a sensor enabled to measure a current and/or a voltage of the first battery and/or the second battery, a controller enabled to compare the measured current with a current threshold and the measured voltage with a voltage threshold, and a switching circuit enabled to connect the controller with one of the first battery and the second battery, based on a result of the comparison.

Various embodiments of the disclosure may describe a method to manage a battery pack. A measurement may be made of a current and/or a voltage of a first battery comprising a plurality of battery cells of the first type and/or of a second battery comprising a plurality of battery cells of the second type, where the first battery, the second battery, and a controller are part of the battery pack. The measured current may be compared with a current threshold and/or the measured voltage may be compared with a voltage threshold. Based on a result of the comparison, the first battery or the second battery may be connected with the controller.

The present disclosure discloses using different types of batteries, which may have different battery characteristics, in one battery pack.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
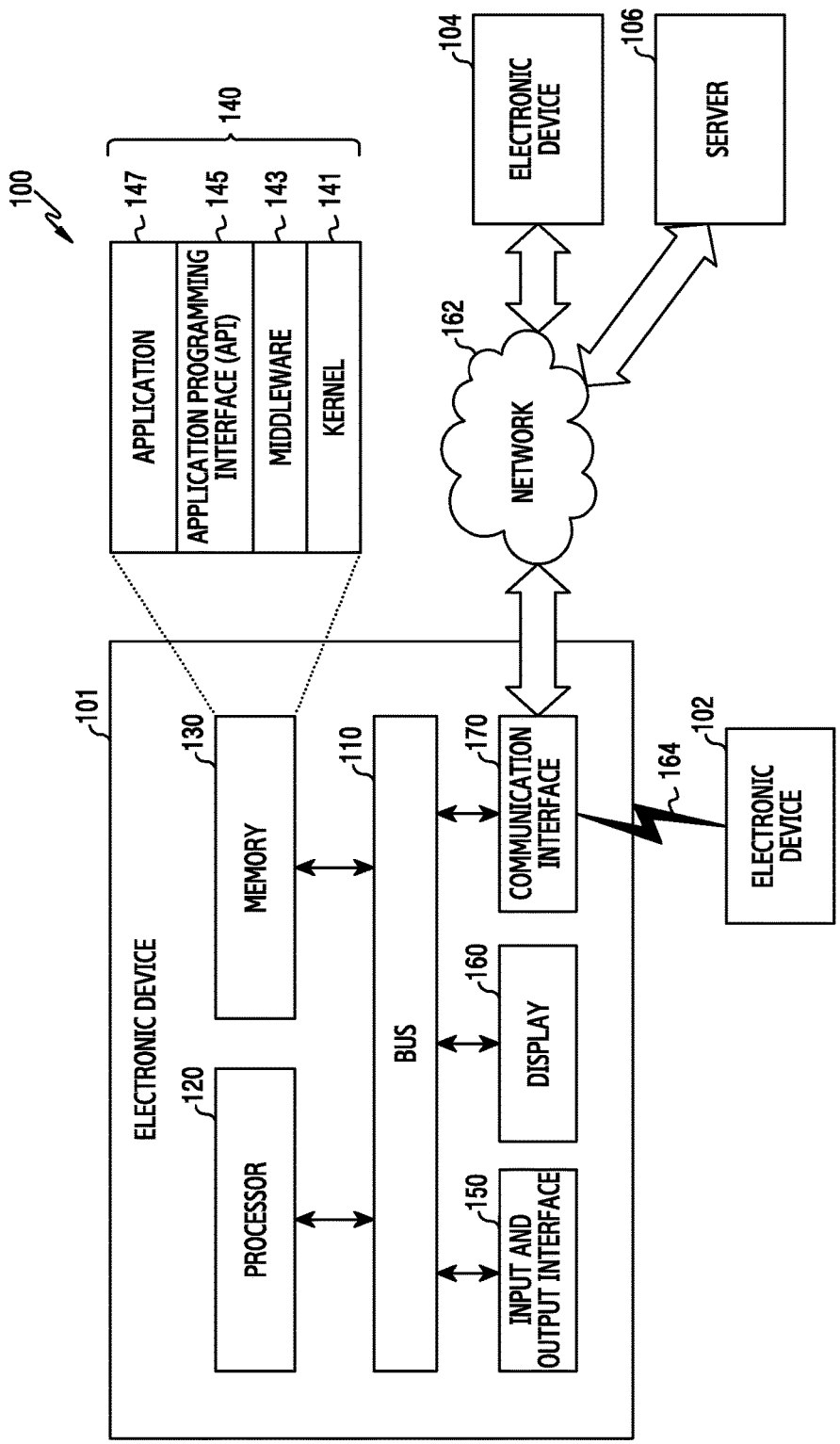
FIG. 1 illustrates a network environment including an electronic device according to an embodiment of the present disclosure.

Various embodiments of the present disclosure will be described with reference to the accompanying drawings. However, it should be understood that there is no intent to limit the present disclosure to the particular forms disclosed herein. Rather, the present disclosure should be construed to cover some embodiments. There may be other embodiments resulting from modifications, equivalents, and/or alternatives of the various embodiments of the present disclosure. In describing the drawings, similar reference numerals may be used to designate similar constituent elements.

As used herein, the expression "have," "may have," "include," or "may include" refers to the existence of a corresponding feature (e.g., numeral, function, operation, or constituent element such as component) and does not exclude one or more additional features. As used herein, singular forms may include plural forms unless the context clearly indicates otherwise.

As used herein, the expression "A and/or B" may include any or all possible combinations of items enumerated together. For example, the expression "A and/or B" may include (1) at least one A, (2) at least one B, or (3) both at least one A and at least one B. Additionally, the word "or" may be interpreted to mean "and/or" when appropriate.

The expression "a first," "a second," "the first," or "the second" used in describing various embodiments of the present disclosure may modify various components regardless of the order and/or the importance but does not limit the corresponding components. The above expressions are used merely for the purpose of distinguishing an element from other elements. For example, a first user device and a second user device indicate different user devices although both of them are user devices. Accordingly, a "first user device" may be referred to as "a second user device," and similarly, "a second user device" may be referred to as "a first user device" without departing from the scope of the present disclosure.

In this disclosure "coupled" and "connected" may be used interchangeably. Furthermore, when a first element is referred to as being coupled (or operatively coupled or communicatively coupled) to a second element, it may be coupled with other element(s) between them. In contrast, when a first element is referred to as being "directly coupled" to a second element, there is no other element between them.

The expression "configured to" used in the present disclosure may be exchanged with, for example, "suitable for," "having the capacity to," "designed to," "adapted to," "made to," or "capable of" according to the situation. The term "configured to" may not necessarily imply "specifically designed to" in hardware. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments and are not intended to limit the present disclosure. Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have meanings equal to the contextual meanings in the relevant field of the art, and are not to be interpreted to have ideal or excessively formal meanings unless clearly defined in the present disclosure. However, it should be noted that a term defined in the present disclosure should not be interpreted to exclude embodiments of the present disclosure unless specifically stated so.

For example, according to various embodiments of the present disclosure, an electronic device may include at least one of a smartphone, a tablet personal computer (tablet PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to various embodiments of the present disclosure, an electronic device may be a smart home appliance. The home appliance may include at least one of, for example, a television (TV), a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to various embodiments of the present disclosure, the electronic device may include, for example, a blood glucose monitoring device, a heart rate monitoring device, a blood pressure measuring device, a body temperature measuring device, a Magnetic Resonance Angiography (MRA) machine, a Magnetic Resonance Imaging (MRI) machine, a Computed Tomography (CT) machine, an ultrasonic machine, a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments of the present disclosure, an electronic device may include at least one of a part of furniture or a building/structure, an electronic board, an electronic signature receiving device, a projector, and various kinds of measuring instruments such as, for example, a water meter, an electric meter, a gas meter, and a radio wave meter. An electronic device according to various embodiments of the present disclosure may be a combination of one or more of the aforementioned various devices. An electronic device according to some embodiments of the present disclosure may be a flexible device. Furthermore, an electronic device according to an embodiment of the present disclosure is not limited to the aforementioned devices, but may be a new electronic device developed with advancement of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment 100 including an electronic device 101 according to various embodiments of the present disclosure.

The electronic device 101 in a network environment 100 according to various embodiments will be described with reference to FIG. 1. The electronic device 101 may include a bus 110, a processor 120, a memory 130, an input/output interface 150, a display 160, and a communication interface 170. According to various embodiments of the present disclosure, at least one of the components of the electronic device 101 may be omitted, or other components may be additionally included in the electronic device 101.

The bus 110 may include a circuit for transferring communication such as, for example, commands, control messages, instructions, status, and/or data between two of more of the processor 120, the memory 130, the input/output interface 150, the display 160, and the communication interface 170.

The processor 120 may include one or more of a Central Processing Unit (CPU), an Application Processor (AP), and a Communication Processor (CP). For example, the processor 120 may carry out operations or data processing related to control and/or communication of the electronic device 101.

The memory 130 may include a volatile memory and/or a non-volatile memory. The memory 130 may store, for example, programs, commands or data received from or generated by or received from the processor 120, the input/output interface 150, the display 160, and the communication interface 170. According to various embodiments of the disclosure, the memory 130 may store software 140. The software 140 may collectively refer to software, firmware, programs, etc. The software 140 may include, for example, a kernel 141, middleware 143, an Application Programming Interface (API) 145, and/or application(s) 147. At least some of the kernel 141, the middleware 143, and the API 145 may be referred to as an Operating System (OS).

The kernel 141 may control or manage system resources such as, for example, the bus 110, the processor 120, the memory 130, the input/output interface 150, the display 160, and the communication interface 170 used for executing an operation or function implemented by the other programs (e.g., the middleware 143, the API 145, or the application(s) 147). The kernel 141 may provide an interface through which the middleware 143, the API 145, or the application(s) 147 may access individual components of the electronic device 101 to control or manage system resources.

The middleware 143 may serve to allow the API 145 or the application(s) 147 to communicate with the kernel 141 to exchange data. Furthermore, the middleware 143 may control, for example, scheduling or load-balancing in response to requests for an operation received from the application(s) 147. Accordingly, the middleware 143 may be configured to allocate use of system resources such as, for example, the bus 110, the processor 120, the memory 130, the input/output interface 150, the display 160, and the communication interface 170 of the electronic device 101 with respect to at least one application of the application(s) 147.

The API 145 is an interface by which the application(s) 147 control functions provided from the kernel 141 or the middleware 143, and may include, for example, at least one interface or function (e.g., instructions) for file control, window control, image processing, or text control.

The input/output interface 150 may serve as an interface that may transfer instructions or data, which is input from a user or an external device such as, for example, the first electronic device 102, the second electronic device 104, or the server 106, to the electronic device 101. Furthermore, the input/output interface 150 may output instructions or data from the electronic device 101 to a user or another external device such as, for example, the first electronic device 102, the second electronic device 104, or the server 106, to the electronic device 101.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various types of contents (e.g., text, images, videos, icons, or symbols) to users. The display 160 may include a touch screen and receive, for example, a touch input, a gesture input, a proximity input, or a hovering input using an electronic pen or a user's body part.

The communication interface 170 may be used for communication between the electronic device 101 and one or more external devices such as, for example, the first electronic device 102, a second electronic device 104, and a server 106. For example, the communication interface 170 may be connected to a network 162 through wireless or wired communication to communicate with external devices such as, for example, the second electronic device 104 or the server 106.

The wireless communication protocol used may be, for example, at least one of Long Term Evolution (LTE), Long Term Evolution-Advanced (LTE-A), Code Division Multiple Access (CDMA), Wideband Code Division Multiple Access (WCDMA), Universal Mobile Telecommunication System (UMTS), Wireless Broadband (WiBro), and Global System for Mobile communication (GSM). The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of communication networks such as a computer network (e.g., a local area network (LAN) or a wide area network (WAN)), the Internet, and a telephone network.

Each of the first electronic device 102 and the second electronic device 104 may be, for example, a device similar to the electronic device 101. According to an embodiment of the present disclosure, the server 106 may include a group of one or more servers. According to various embodiments, all or some of the operations performed by the electronic device 101 may be performed by another electronic device or a plurality of electronic devices such as, for example, the first electronic device 102, the second electronic device 104, or the server 106. According to various embodiments of the present disclosure, when the electronic device 101 has to perform any function or service automatically or in response to a request, the electronic device 101 may request that at least one external electronic device such as, for example, the first electronic device 102, the second electronic device 104, or the server 106 perform at least some functions related to the requested function or service. The external electronic device such as, for example, the first electronic device 102, the second electronic device 104, or the server 106 may carry out the requested function or service and transfer the result to the electronic device 101. The electronic device 101 may provide the requested functions or services based on the received result as is or after additionally processing the received result. To achieve this, various embodiments of the disclosure may use, for example, cloud computing, distributed computing, and/or client-server computing technology.

Figure 2:
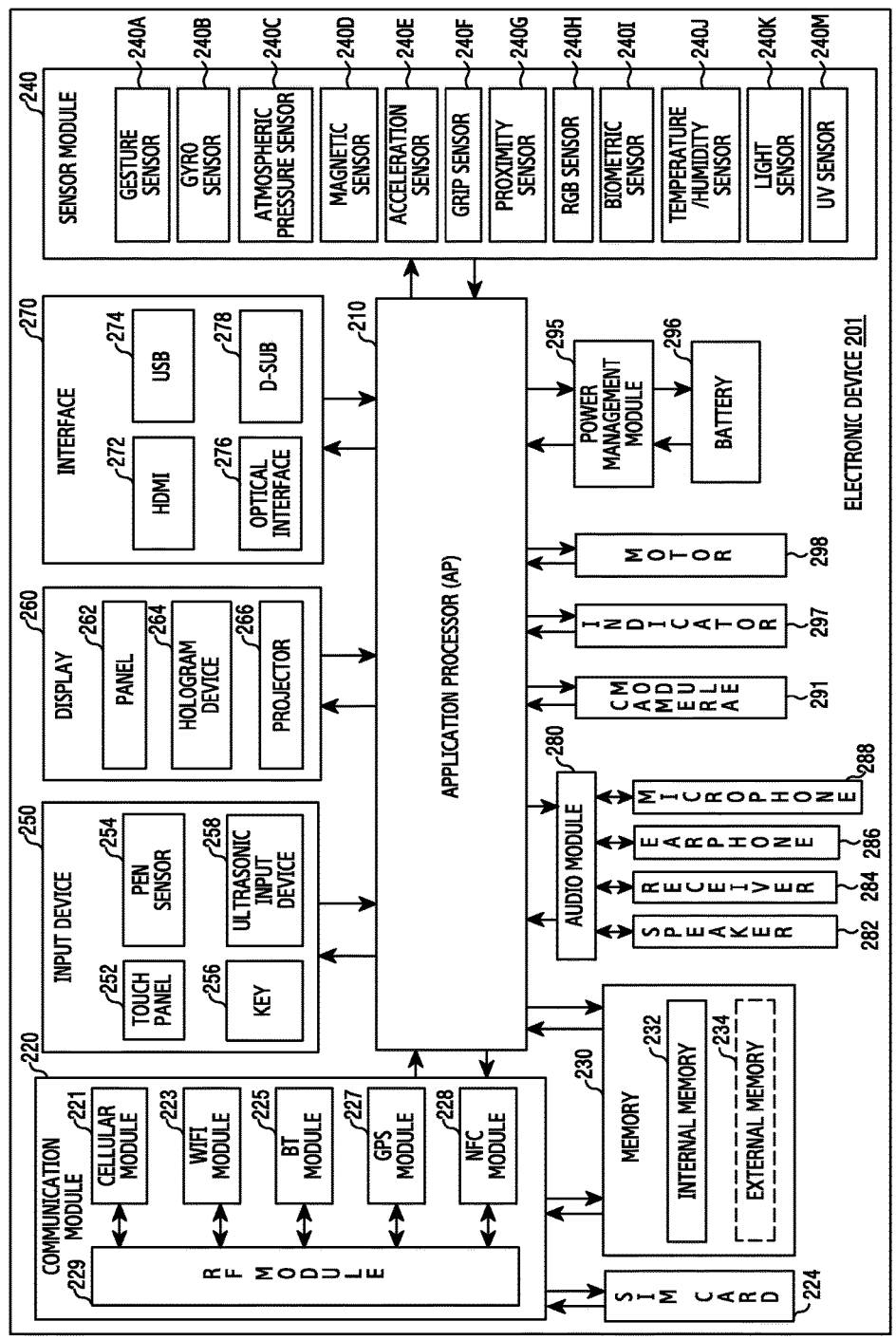
FIG. 2 is a block diagram of an electronic device according to various embodiments of the present disclosure.

FIG. 2 is a block diagram of an electronic device 201 according to various embodiments of the present disclosure.

The electronic device 201 may include, for example, all or some of the electronic device 101 illustrated in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may use an operating system or an application program stored in the memory 230 to control a plurality of hardware or software components in the electronic device 201 as well as external electronic devices such as, for example, the first electronic device 103, the second electronic device 104, and the server 106, and perform a variety of data processing and calculations. The AP 210 may be embodied as, for example, a System on Chip (SoC). According to an embodiment of the present disclosure, the AP 210 may further include a Graphic Processing Unit (GPU) and/or an image signal processor. The AP 210 may also include at least some (e.g., a cellular module 221) of the components illustrated in FIG. 2. The AP 210 may load instructions or data received from at least one other component (e.g., a non-volatile memory) to a volatile memory to process the loaded instructions or data, and may store various types of data in the memory 230.

The communication module 220 may have a configuration equal or similar to the communication interface 170 of FIG. 1. The communication module 220 may include, for example, a cellular module 221, a WiFi module 223, a Bluetooth (BT) module 225, a GPS module 227, a Near Field Communication (NFC) module 228, and a Radio Frequency (RF) module 229.

The cellular module 221 may support voice call, video call, text message services, or Internet services through, for example, a communication network. According to an embodiment of the present disclosure, the cellular module 221 may identify and authenticate electronic devices 201 within a communication network by using, for example, their respective SIM card 224. According to an embodiment of the present disclosure, the cellular module 221 may perform at least some of functions that may be provided by the AP 210. According to an embodiment of the present disclosure, the cellular module 221 may include a communication processor (CP).

The WiFi module 223, the BT module 225, the GPS module 227, and the NFC module 228 may include, for example, a processor for processing data transmitted/received through the corresponding module. According to some embodiments of the present disclosure, two or more of the cellular module 221, the WiFi module 223, the BT module 225, the GPS module 227, and the NFC module 228 may be included in one Integrated Chip (IC) or IC package.

The RF module 229 may transmit/receive, for example, a RF communication signal. The RF module 229 may include, for example, a transceiver, a Power Amp Module (PAM), a frequency filter, a Low Noise Amplifier (LNA), or an antenna. According to another embodiment of the present disclosure, at least one of the cellular module 221, the WiFi module 223, the BT module 225, the GPS module 227, and the NFC module 228 may transmit/receive RF signals through a separate RF module.

The SIM card 224 may be, for example, a card including a subscriber identification module and/or an embedded SIM, and may have store on it a unique identification information such as, for example, an Integrated Circuit Card Identifier (ICCID), or subscriber information such as, for example, International Mobile Subscriber Identity (IMSI).

The memory 230 may include, for example, an internal memory 232 or an external memory 234. The internal memory 232 may include volatile memory (e.g., Dynamic Random Access Memory (DRAM), Static Random Access Memory (SRAM), Synchronous Dynamic Random Access Memory (SDRAM), etc.) and/or non-volatile memory (e.g., Read Only Memory (ROM), One Time Programmable Read Only Memory (OTPROM), Programmable Read Only Memory (PROM), Erasable and Programmable Read Only Memory (EPROM), Electrically Erasable and Programmable Read Only Memory (EEPROM), flash memory, hard disk drive, Solid State Drive (SSD), etc.).

The external memory 234 may further include a flash drive such as, for example, a Compact Flash (CF), a Secure Digital (SD), a Micro Secure Digital (Micro-SD), a Mini Secure Digital (Mini-SD), an extreme Digital (xD), a memory stick, etc. The external memory 234 may be functionally and/or physically connected to the electronic device 201 through various interfaces.

The sensor module 240 may measure, for example, a physical quantity or detect an operation state of the electronic device 201, and may convert the measured or detected information to an electrical signal. The sensor module 240 may include at least one of, for example, a gesture sensor 240a, a gyro sensor 240B, an atmospheric pressure sensor 240C, a magnetic sensor 240D, an acceleration sensor 240E, a grip sensor 240F, a proximity sensor 240G, a color sensor 240H (e.g., a Red/Green/Blue (RGB) sensor), a bio-sensor 240I, a temperature/humidity sensor 240J, an illumination sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an InfraRed (IR) sensor, an iris scanner, and/or a fingerprint sensor. The sensor module 240 may further include a control circuit for controlling at least one sensor included therein. According to some embodiments of the present disclosure, the electronic device 201 may further include a processor that is configured, as a part of the AP 210 or a separate component from the AP 210, to control the sensor module 240, thereby controlling the sensor module 240 while the AP 210 is in a sleep mode.

The input device 250 may include, for example, a touch panel 252, a (digital) pen sensor 254, a key 256, or an ultrasonic input device 258. The touch panel 252 may be, for example, a capacitive type, a resistive type, an infrared type, and/or an ultrasonic type. The touch panel 252 may also include a control circuit. The touch panel 252 may further include a tactile layer that provides a tactile response to a user.

The (digital) pen sensor 254 may include, for example, a recognition sheet that is a part of the touch panel or a separate recognition sheet. The key 256 may include, for example, a physical button, an optical key, and/or a keypad. The ultrasonic input device 258 may detect ultrasonic waves received by an input tool such as, for example, the microphone 288 in order to process data corresponding to the received ultrasonic waves.

The display 260 may include a panel 262, a hologram device 264, and/or a projector 266. The panel 262 may include a configuration that is identical or similar to the display 160 illustrated in FIG. 1. The panel 262 may be embodied to be, for example, flexible, transparent, and/or wearable. The panel 262 may also be configured to be integrated with the touch panel 252 as a single module. The hologram device 264 may show a stereoscopic image by using interference of light. The projector 266 may project light on to a screen to display an image. For example, the screen may be located inside or outside the electronic device 201. According to an embodiment of the present disclosure, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, and/or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/MultiMedia Card (MMC) interface, and/or an Infrared Data Association (IrDA) standard interface.

The audio module 280 may convert sound to electrical signals and vice versa. At least some components of the audio module 280 may be included in, for example, the input/output interface 150 illustrated in FIG. 1. The audio module 280 may process sound information input through, for example, the microphone 288, or output electrical signals through, for example, a speaker 282, a receiver 284, earphones 286, the microphone 288.

The camera module 291 may capture, for example, a still image or video and, according to an embodiment of the present disclosure, may include one or more image sensors such as, for example, a front sensor or a back sensor, a lens, an Image Signal Processor (ISP), or a flash (e.g., an LED or a xenon lamp).

The power management module 295 may manage, for example, power of the electronic device 201. According to various embodiments of the present disclosure, the power management module 295 may include a Power Management Integrated Circuit (PMIC), a charger Integrated Circuit (IC), and/or a battery gauge. The PMIC may support a wired and/or wireless charging scheme. Examples of the wireless charging method may include, for example, a magnetic resonance scheme, a magnetic induction scheme, an electromagnetic wave scheme, etc. The wireless charging method may use appropriate circuits (e.g., a coil loop, a resonance circuit, a rectifier, etc.) for wireless charging. The battery gauge may measure, for example, the remaining charge in the battery, a charging voltage, current, and/or temperature. The battery 296 may include, for example, a rechargeable battery and/or a solar battery.

The indicator 297 may indicate a particular status of the electronic device 201 or a part thereof (e.g., the AP 210). The status may be a booting status, a message status, a charging status, etc. The motor 298 may convert an electrical signal into mechanical vibrations, and may generate a vibration or haptic effect. Although not illustrated, the electronic device 201 may include a processing device such as a GPU that may support, for example, mobile TV. The processing device for supporting mobile TV may process media data transmitted using standards such as Digital Multimedia Broadcasting (DMB), Digital Video Broadcasting (DVB), media flow etc.

Each of the components of the electronic device 201 according to the present disclosure may be implemented by one or more components and the name of the corresponding component may vary depending on a type of the electronic device. In various embodiments, the electronic device 201 may include at least one of the above-described elements. Some of the above-described elements may be omitted from the electronic device 201, or the electronic device may further include additional elements. Furthermore, some of the elements of the electronic device according to various embodiments of the present disclosure may be coupled to form a single entity while performing the same functions as those of the corresponding elements before the coupling.

Figure 3:
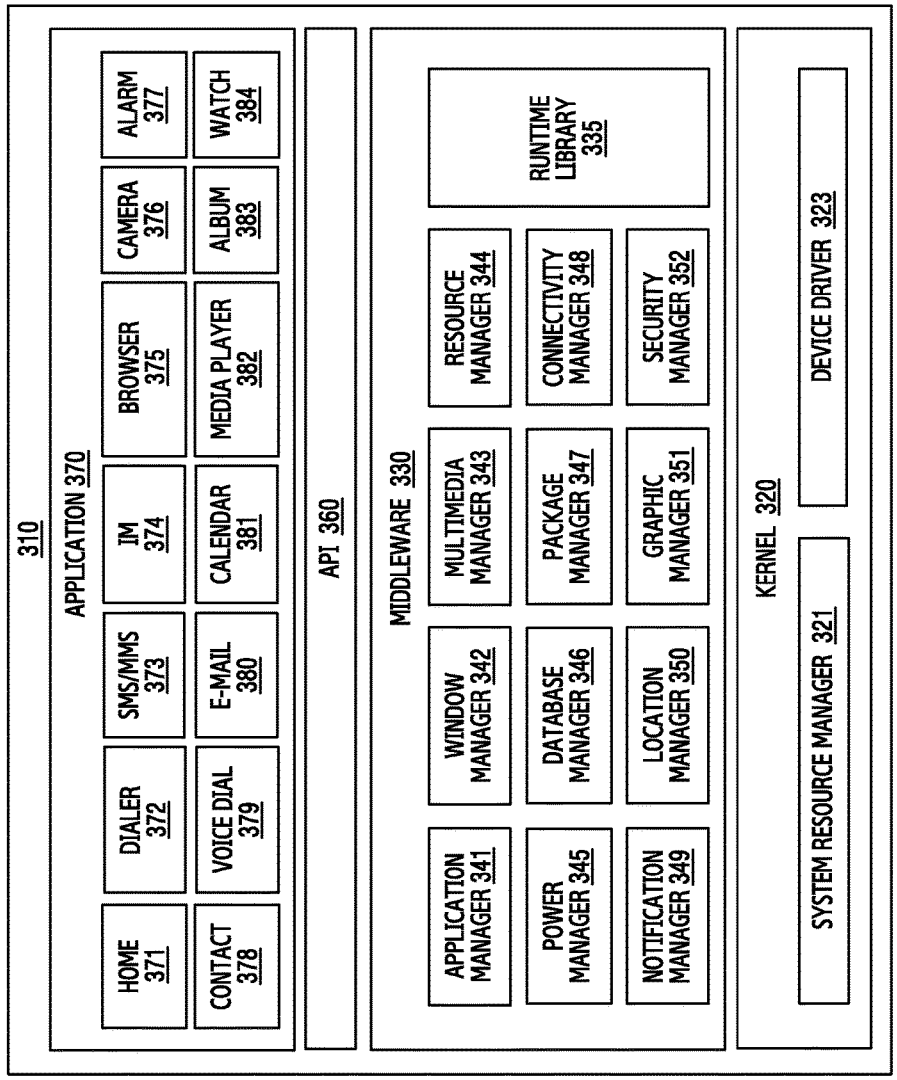
FIG. 3 is a block diagram of a program module according to various embodiments of the present disclosure.

FIG. 3 is a block diagram of a program module 310 according to various embodiments of the present disclosure.

According to various embodiments of the disclosure, the program module 310, which may be similar to the software 140, may include an Operating System (OS) for controlling resources related to an electronic device (e.g., the electronic device 101 and/or 201) and/or various applications executed in the operating system.

The program module 310 may include a kernel 320, middleware 330, an Application Programming Interface (API) 360, and/or applications 370. At least some of the program module 310 may be preloaded in the electronic device and/or downloaded from a server (e.g., the server 106).

The kernel 320 may include, for example, a system resource manager 321 or a device driver 323. The system resource manager 321 may control, allocate, or collect system resources. According to various embodiments of the present disclosure, the system resource manager 321 may include, for example, a process management unit, a memory management unit, and/or a file system management unit. The device driver 323 may include, for example, a display driver, a camera driver, a Bluetooth driver, a shared-memory driver, a USB driver, a keypad driver, a WiFi driver, an audio driver, and/or an Inter-Process Communication (IPC) driver.

The middleware 330 may provide functions required by the applications 370 and/or provide various functions to the applications 370 through the API 360 so that the applications 370 may efficiently use the system resources of the electronic device. According to various embodiments of the present disclosure, the middleware 330 may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The run time library 335 may include, for example, a library module that a compiler uses to add new functions when one of the applications 370 is executing. The run time library 335 may perform, for example, input/output management, memory management, and/or an arithmetic function.

The application manager 341 may manage, for example, a life cycle of at least one application among the applications 370. The window manager 342 may manage GUI resources used in a screen. The multimedia manager 343 may detect a format required for reproducing various media files and encode or decode a media file using a codec appropriate for the corresponding format. The resource manager 344 may manage resources such as source code, memory or storage space of at least one application among the applications 370.

The power manager 345 may operate together with, for example, a Basic Input/Output System (BIOS) so as to manage a battery and may provide power information required for the operation of the electronic device. The database manager 346 may generate, search for, and/or change a database to be used by at least one of the applications 370. The package manager 347 may manage the installation or updating of applications distributed in the form of a package file.

The connectivity manager 348 may manage wireless connections such as, for example, WiFi or Bluetooth. The notification manager 349 may display or notify of an event such as a received message, an appointment, a proximity notification, etc. to a user. The location manager 350 may manage location information of the electronic device. The graphic manager 351 may manage graphic effects to be provided to a user and user interfaces related to the graphic effects. The security manager 352 may provide various security functions required for system security or user authentication. According to various embodiments of the present disclosure, when the electronic device (e.g., the electronic device 101) has a telephone call function, the middleware 330 may further include a telephony manager for managing a voice or video call function of the electronic device.

The middleware 330 may include a middleware module for forming a combination of various functions of the aforementioned components. The middleware 330 may provide modules specialized according to the type of operating system in order to provide differentiated functions. In addition, a few existing components may be dynamically removed from the middleware 330, or new components may be added to the middleware 330.

The API 360, which is a set of API programming functions, may be specific for each operating system. For example, Android operating system may have an API set that may be different than an API set for iOS. Some operating systems, for example, Tizen, may have two or more API sets for each platform.

The applications 370 may include, for example, one or more applications that can provide functions such as home 371, dialer 372, short message service/multimedia message service (SMS/MMS) 373, Instant Message (IM) 374, browser 375, camera 376, alarm 377, contacts 378, voice dialer 379, email 380, calendar 381, media player 382, album 383, and clock 384. Some other applications may relate to health care (e.g., measure exercise quantity or blood sugar) or environment information (e.g., atmospheric pressure, humidity, or temperature information).

According to various embodiments of the present disclosure, the applications 370 may include an application supporting information exchange between the electronic device (e.g., the electronic device 101) and external electronic devices (e.g., the first electronic device 102 and the second electronic device 104). This information exchange application may include, for example, a notification relay application for transmitting predetermined information to the external electronic device, or a device management application for managing the external electronic device.

The notification relay application may include a function for transferring to the external electronic device (e.g., the electronic device 102 or 104) notification information generated from other applications of the electronic device 101 (e.g., an SMS/MMS application, an e-mail application, a health management application, or an environmental information application). Furthermore, the notification relay application may receive notification information from, for example, an external electronic device and provide the received notification information to a user. The device management application may manage (e.g., install, delete, or update), for example, a function for at least a part of the external electronic device (e.g., the electronic device 104) communicating with the electronic device (e.g., turning on/off the external electronic device itself (or some elements thereof) or adjusting brightness (or resolution) of a display), applications executed in the external electronic device, or services provided from the external electronic device (e.g., a telephone call service or a message service).

According to various embodiments of the disclosure, the applications 370 may include an application (e.g., health management application) designated according to attributes of an external electronic device. For example, the applications 370 may include an application received from the server 106 for a medical device (e.g., the first electronic device 102). The applications 370 may include a preloaded application or a third party application which can be downloaded. The names of the components of the program module 310 according to the illustrated embodiment may vary according to the type of operating system.

According to various embodiments of the disclosure, at least a part of the programming module 310 may be implemented in software, firmware, hardware, or a combination thereof. The programming module 310 may include, for example, a module, program, routine, sets of instructions, process, etc. for performing one or more functions.

Figure 4:
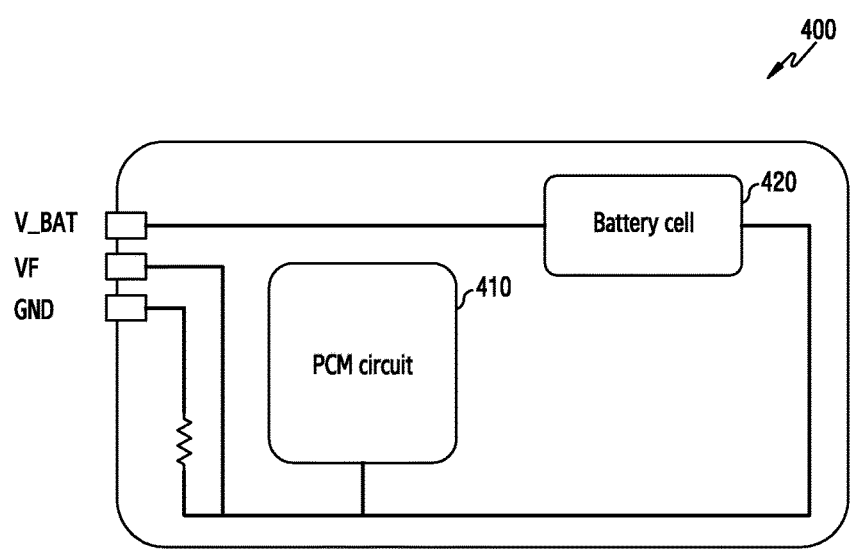
FIG. 4 illustrates a battery for an electronic device according to an embodiment of the present disclosure.

FIG. 4 illustrates a battery for an electronic device according to an embodiment of the present disclosure.

Referring to FIG. 4, a battery 400 may be included within various electronic devices or used as an external battery with various electronic devices such as a smart phone, a wearable device, Internet of Things (IoT), an electric car, a drone, etc.

The battery 400 may include a Protection Circuit Module (PCM) circuit 410 and a battery cell 420. In this case, the PCM circuit 410 may serve to protect the battery 400 during operation. More specifically, the PCM circuit 410 may perform a function of blocking a charging current to prevent an overcharge state in which a battery voltage becomes larger than or equal to a high voltage threshold. The PCM circuit 410 may also perform a function of blocking a discharge current to prevent an overdischarged state where the battery voltage becomes smaller than a low voltage threshold.

Furthermore, the PCM circuit 410 may serve to block the charging current or the discharge current when the charging current or the discharge current is larger than or equal to a particular threshold due to an error of a device that is coupled to the battery 400. In addition, when a short circuit occurs in an external terminal of the battery 400, the PCM circuit 410 may perform a short circuit protection function to prevent damage to the battery 400 due to short circuit of the external terminal.

Although FIG. 4 illustrates only one battery cell 420, which is a basic unit of the battery 400, the battery 400 may include several cells that may be connected in series or in parallel. Furthermore, the battery cell 420 may include various types of cells such as, for example, nickel-cadmium (Ni—Cd), nickel-metal hydride (Ni-MH), lead acid, a lithium-ion (Li-ion), lithium-polymer (Li—Po), lithium-iron phosphate (Li—FePO4), etc. The different characteristics of the secondary cells are shown in Table 1.

TABLE 1

| Division | | Ni—Cd | Ni-MH | lead acid battery | Li-ion | Li—Po |
|---|---|---|---|---|---|---|
| Capacity increase efficiency (Wh/Kg) | | 45~80 | 60~120 | 30~50 | 110~160 | 100~130 |
| Lifespan (Cycle) | | 1500 | 300~500 | 200~300 | 500~1000 | 300~500 |
| Quick charging time (hr) | | 1 | 2~4 | 8~16 | 2~4 | 2~4 |
| Overcharge allowable range | | middle | low | high | Very low | low |
| Self-discharge rate (%) | | 20 | 30 | 5 | 10 | 10 or smaller |
| Electromotive force (V) | | 1.25 | 1.25 | 2 | 3.6 | 3.6 |
| Load current | Maximum | 20 C | 5 C | 5 C | 2 C or more | 2 C or more |
| | Normal | 1 C | 0.5 C or smaller | 0.2 C | 1 C or smaller | 1 C or smaller |

Table 1 shows values determined for the various secondary cells under a particular condition.

The capacity increase efficiency indicates energy capacity of a battery per unit weight of the battery. For example, if the capacity increase efficiency of the Ni—Cd battery is 60 Wh/Kg and the capacity increase efficiency of the Li-ion battery is 120 Wh/Kg, the Ni—Cd battery will be two times heavier than the Li-ion battery to provide the same total energy.

The lifespan refers to the number of times a battery can be charged and discharged. For example, the Ni—Cd battery can typically go through 1500 charge/discharge cycles. Accordingly, it can be seen that the Ni—Cd battery has better lifespan compared to other batteries in Table 1.

The quick charging time refers to a time spent when the battery is quickly charged. For example, under an assumption that the battery capacity is configured equally, the Ni—Cd battery has quick charging time of one hour, so it can be seen that the Ni—Cd battery has better quick charging time compared to other batteries in Table 1. The quick charge time characteristic may be related to the amount of charging current that can be received by a battery.

The overcharge allowance range refers to how much overcharge, in which a battery voltage exceeds a particular threshold based on a result of the battery charging, is allowable. According to the above table, the lead acid battery has a relatively large range where the overcharge is allowable, and the Li-ion battery has a relatively small range where the overcharge is allowable.

The self-discharge rate refers to a battery discharging when it is not in use. For example, when the batteries are left without any use for the same predetermined time, the Ni-MH battery may discharge 30% of its total capacity. Accordingly, it can be seen that the Ni-MH battery has a higher self-discharge rate than the other batteries in Table 1. Since the Li—Po battery has a self-discharge rate equal to or smaller than 10%, the Li—Po battery can be said to have a relatively low self-discharge rate given the conditions for the batteries under which Table 1 was generated.

The electromotive force refers to a voltage each of the batteries can output and, it can be seen in Table 1 that some of the electromotive forces of the batteries are different.

Lastly, the maximum load current refers to a maximum current that can be safely discharged or charged when the battery is used. For example, the Ni—Cd battery has a maximum load current of 20 C, which means that the current of 20 times the capacity of the Ni—Cd battery can be charged or discharged within a safe range. In other words, the battery having a high maximum load current can more easily supply power to an electronic device such as, for example, a motor that may require high instantaneous current, and is more suitable for quick charging compared to other batteries. The normal load current refers to a current discharged or charged in a range in which the battery is generally used.

Figure 5:
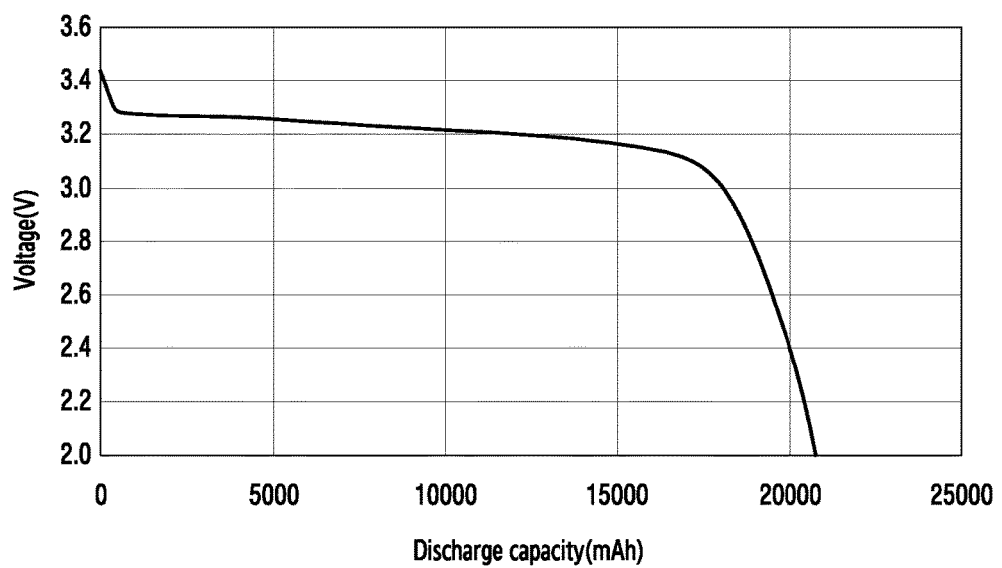
FIG. 5 shows a graph illustrating discharge rate of an exemplary battery according to an embodiment of the present disclosure.

FIG. 5 shows a graph illustrating discharge rate of an exemplary battery according to an embodiment of the present disclosure.

A discharge capacity vs voltage graph is shown for a Li—FePO4 battery. In FIG. 5 there can be seen a graph of the discharge rate for this battery where the horizontal axis indicates a discharge capacity in mAh and the vertical axis indicates a battery voltage (V). Referring to the discharge rate graph, the battery voltage gently decreases up to where substantially 85% of the total battery capacity is discharged. The battery voltage then drops rapidly.

In other words, the Li—FePO4 battery maintains a stable, usable voltage until about 85% of the total battery capacity is gone. Accordingly, a utilization range of the battery is very good.

Figure 6:
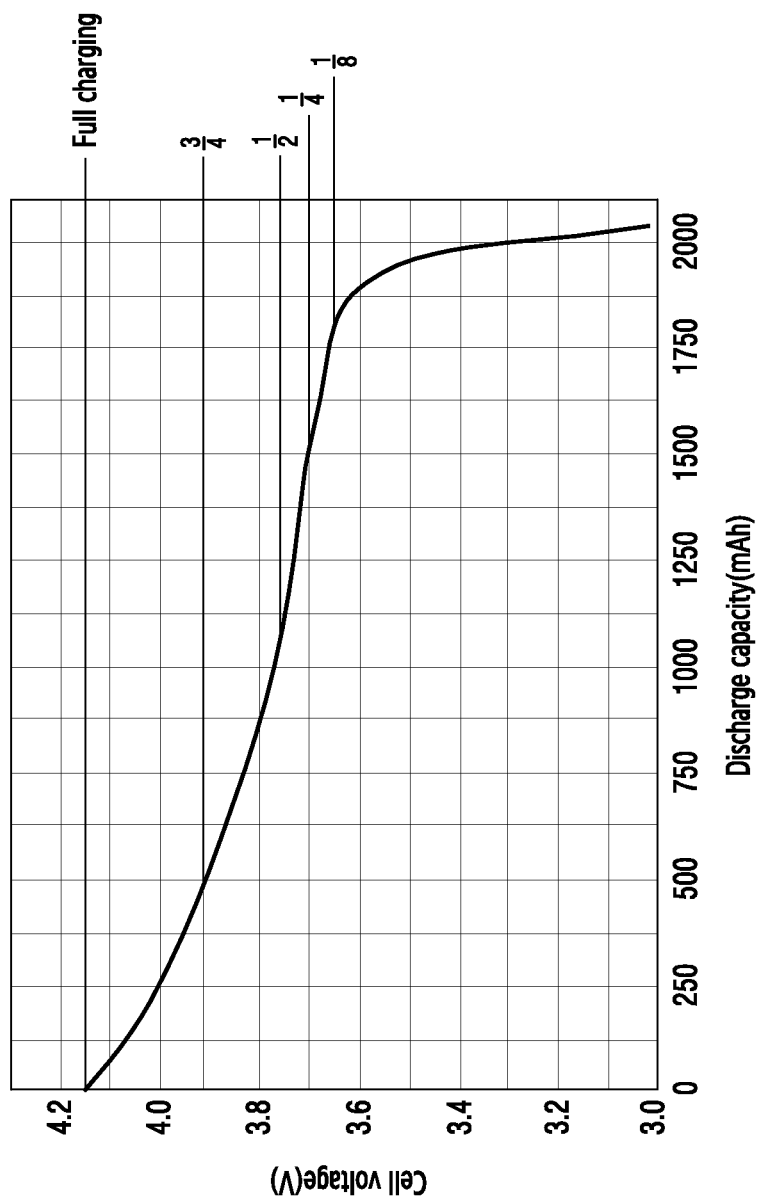
FIG. 6 shows a graph illustrating discharge rate of an exemplary battery according to an embodiment of the present disclosure.

FIG. 6 shows a graph illustrating discharge rate of an exemplary battery according to an embodiment of the present disclosure.

A discharge capacity vs voltage graph is shown for a Li—Po battery. In the discharge rate graph of FIG. 6, a horizontal axis indicates a discharge capacity (mAh) and a vertical axis indicates a battery cell voltage (V). Referring to the discharge rate graph, as the battery is discharged the battery cell voltage decreases constantly. Compared to the discharge rate characteristic of the Li—FePO4 battery illustrated in FIG. 5, the Li—Po battery graph in FIG. 6 shows a relatively large decrease in the battery voltage.

As described above, the Li—FePO4 battery and the Li—Po battery have a difference in the discharge rate characteristic, and the different characteristics of the batteries may be variously used according to a situation and a condition in which the batteries are utilized.

Figure 7:
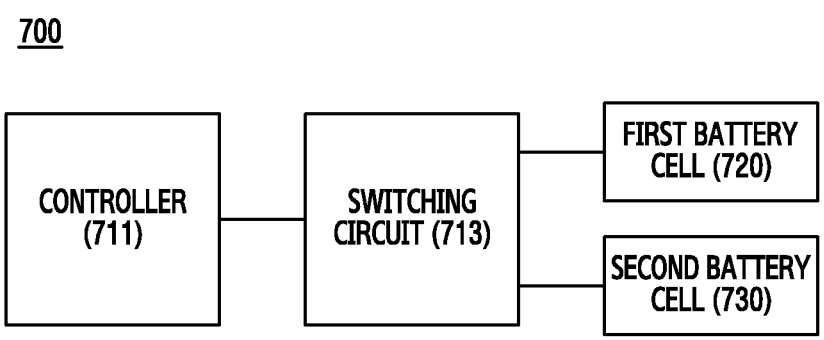
FIG. 7 is a block diagram of a battery according to an embodiment of the present disclosure.

FIG. 7 is a block diagram of a battery according to an embodiment of the present disclosure.

Referring to FIG. 7, the electronic device 700 may include a controller 711, a switching circuit 713, a first battery cell 720, and a second battery cell 730. The electronic device 700 maybe a battery pack. Although FIG. 7 illustrates that the battery pack 700 has only the first battery cell 720 and the second battery cell 730, the battery pack 700 may further include a plurality of battery cells such as, for example, a third battery cell, a fourth battery cell, etc.

The switching circuit 713 may be selectively coupled with a plurality of battery cells to electrically connect at least one of the battery cells with the controller 711. In various embodiments of the disclosure, the battery pack 700 may include a sensor (not illustrated in FIG. 7) that may be coupled with the controller 711, the switching circuit 713, and/or the plurality of battery cells. The sensor may be separate from the controller 711 and may be used to measure current and voltage from, for example, each of the first battery cell 720 and the second battery cell 730. In various other embodiments of the disclosure, the sensor may be a part of the controller 711.

When the electronic device 201 operates, the battery pack 700 may supply power to the electronic device 201 or receive power from the electronic device 201 to be charged. The battery pack 700 according to an embodiment of the present disclosure may include the controller 711 for signaling the switching circuit 713 when to switch from one battery cell to another battery cell. For example, if current from the first battery cell 720 is larger than or equal to a first current threshold, the controller 711 may transmit a signal to terminate the connection with the first battery cell 720 and configure a connection with the second battery cell 730 in order to have the second battery cell 730 provide power to the electronic device 201. A battery pack or a battery cell providing power to an electronic device 201 may also be said to "source power" or "discharge" to the electronic device 201.

According to an embodiment of the present disclosure, the first battery cell 720 may be one of Ni—Cd, Ni-MH, lead acid, Li-ion, Li—Po, or Li—FePO4 battery type and the second battery cell 730 may be another of Ni—Cd, Ni-MH, lead acid, Li-ion, Li—Po, or Li—FePO4 battery type. For example, the first battery cell 720 may be Li-ion battery type and the second battery cell 730 may be Ni—Cd battery type.

Accordingly, the controller 711 may compare current from the first battery cell 720 to a predetermined first current threshold. The first current threshold may be, for example, 1000 mA. When the current from the first battery cell 720 is larger than or equal to 1000 mA, the controller 711 may determine that the electronic device 201 needs relatively large power consumption, and transmits a control signal to switch battery cells to the switching circuit 713.

When the switching circuit 713 receives the control signal, the switching circuit 713 may terminate the connection with the first battery cell 720 and configure a connection with the second battery cell 730. Accordingly, during time of high current demand power may be provided by the second battery cell 730 that is of Ni—Cd battery type, which may be more conducive to providing high current output. In other words, when current demand from the electronic device 201 is larger than or equal to a predetermined first current threshold, in this case 1000 mA, the controller 711 may switch from the first battery cell 720 to the second battery cell 730 that may be better able to provide the higher current. As a result, the second battery cell 730, which is a Ni—Cd battery type, may be selected since it is more favorable for large current demands.

Later, when the electronic device 201 requires less current, the controller 711 may determine that the current from the second battery cell 730 is smaller than the first current threshold of 1000 mA. Accordingly, the controller 711 may send a control signal to the switching circuit 713 to switch from the second battery cell 730 to the first battery cell 720. Accordingly, the switching circuit 713 may terminate the connection with the second battery cell 730 and configure a connection with the first battery cell 720. In this manner, the first battery cell 720 of Li-ion battery type may be used during times of low current demand rather than the battery cell 730 of Ni—Cd battery type. This is because the Li-ion battery type may be more favorable than the Ni—Cd battery type for low current needs based on characteristics such as the capacity increase efficiency and the self-discharge rate, and thereby improve efficiency of the use of the battery pack 700.

Additionally, the controller 711 may measure a voltage of the first battery cell 720 and/or the second battery cell 730, and the controller 711 may compare the measured voltage for each cell to determine whether that battery cell may be in a sufficiently discharged state that it should not be used until charged. The controller 711 may compare the measured voltage of, for example, the second battery cell 730 with a predetermined first voltage threshold. For example, the first voltage threshold may be 3.35 V. When the voltage of the second battery cell 730 is larger than or equal to 3.35 V, the controller 711 may determine that the second battery cell 730 is not completely discharged and thus the second battery cell 730 can be still used. In contrast, when the voltage of the second battery cell 730 is smaller than 3.35 V, the controller 711 may determine that the second battery cell 730 is completely discharged. Completely discharged does not necessarily mean that there is no charge in the battery, just that it is below a minimum voltage threshold. Accordingly, the controller 711 may transmit a control signal to the switching circuit 713 to switch from the second battery cell 730 to the first switching cell 720. The switching circuit 713 may terminate the connection with the second battery cell 730 and configure a connection with the first battery cell 720 that may not be completely discharged.

In this manner, the controller 711 may detect whether a battery cell in use may be suitable for the purposes of the electronic device 201, and, if not, then switch to another battery cell that may still have enough charge to be suitable for the purposes of the electronic device 201. When the controller 711 switches to the last battery cell that is not discharged, and then that last battery cell's voltage falls below the second threshold value, then the controller 711 may determine that all battery cells are completely discharged.

According to various embodiments of the present disclosure, the switching circuit 713 may initially have configured the first battery cell 720 to provide power, and the first battery cell 720 may be, for example, a Li-ion battery type. As in the example above, the second battery cell 730 may be of Ni—Cd battery type. Furthermore, the first battery cell 720 may be charged by an external charging device coupled with the electronic device 201. At this time, the sensor may measure a charging current provided to the first battery cell 720.

The controller 711 may compare the charging current of the first battery cell 720 with the predetermined second current threshold. The second current threshold may be, for example, a predetermined value of 1000 mA. When the charging current of the first battery cell 720 is larger than or equal to 1000 mA, the controller 711 may determine that quick charging is currently being performed, and then transmit a control signal to switch battery cells to the switching circuit 713. This may be because the second battery cell 730 is of Ni—Cd battery type and that battery type is better suited for quick charging because of its high maximum load current. Accordingly, the second battery cell 730 that is better suited for quick charging can be quick charged first, thereby improving efficiency of the use of the battery.

However, before transmitting the control signal to switch, the controller 711 may determine whether the second battery cell 730 is completely charged. If the second battery cell 730 is completely charged, the first battery cell 720 will be charged. When the second battery cell 730 is not completely charged, the control signal may be transmitted to the switching circuit 713 to switch to the second battery cell 730.

To determine whether the second battery cell 730 is fully charged, the controller 711 may compare the voltage of the second battery cell 730 with a predetermined second voltage threshold of, for example, 4.3 V. When the voltage of the second battery cell 730 is smaller than 4.3 V, the controller 711 may determine that the second battery cell 730 is not completely charged and charging current may be applied to the second battery cell 730. In contrast, when the voltage of the second battery cell 730 is larger than or equal to 4.3V, the controller 711 may determine that the second battery cell 730 is completely charged and will not apply charging current to the second battery cell 730. Completely charged does not necessarily mean that a battery cannot hold any more charge, but that the battery voltage is above a threshold for determining that its charge is sufficient to be considered completely charged.

Thereafter, the controller 711 may additionally identify whether the first battery cell 720 is completely charged. When the first battery cell 720 is completely charged, the controller 711 may determine that all battery cells are completely charged. In this way, the controller 711 may keep track of battery cells and the order that they may be charged.

While the battery pack 700 was discussed as a part of the electronic device 201 to simplify discussion, the present disclosure does not limit the battery pack 700 to such. The battery pack 700 may be, for example, a stand-alone battery pack that may be connected to an electronic device such as the electronic device 201 via, for example, a cable to supply power to the electronic device 201 that may have its own internal battery.

Figure 8:
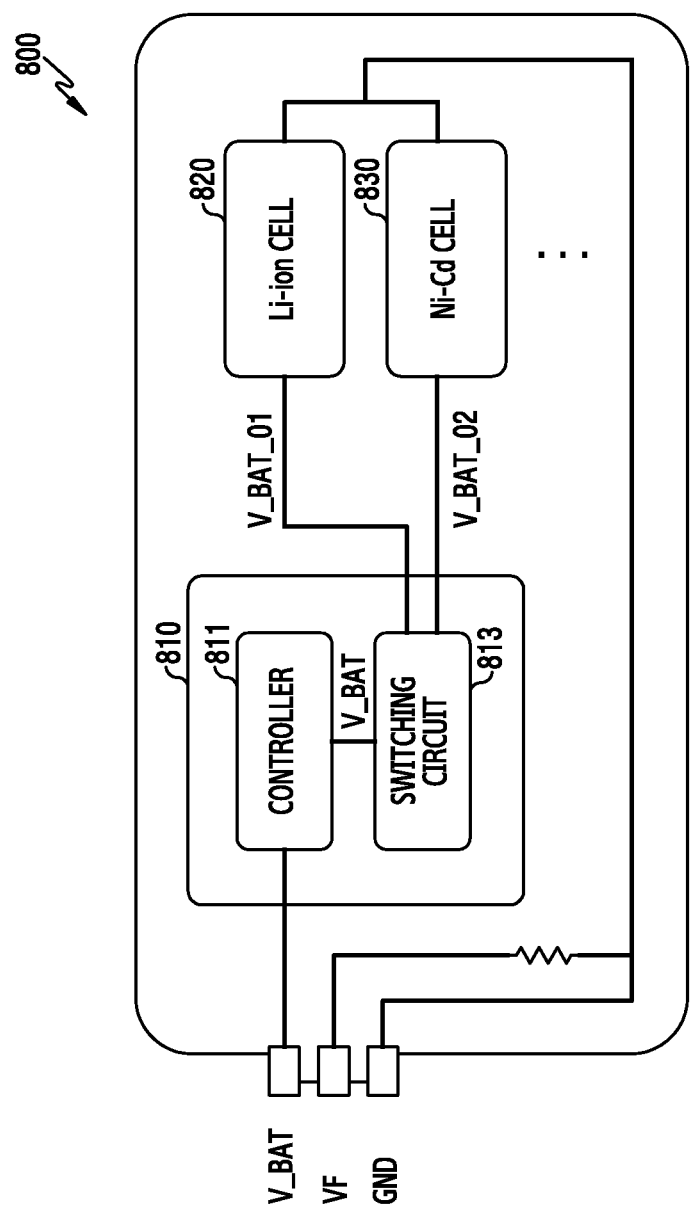
FIG. 8 illustrates a configuration of a battery according to an embodiment of the present disclosure.

FIG. 8 illustrates a configuration of a battery according to an embodiment of the present disclosure.

Referring to FIG. 8, the battery pack 800 according to various embodiments of the present disclosure may include a PCM circuit 810 including a controller 811 and a switching circuit 813, and a plurality of battery cells including a Li-ion cell 820 and a Ni—Cd cell 830. The controller 811 and the switching circuit 813 may exist as separate devices coupled with the PCM circuit 810, and the switching circuit 813 may be selectively connected to a plurality of battery cells including the Li-ion cell 820 and the Ni—Cd cell 830. Furthermore, the Li-ion cell 820 and the Ni—Cd cell 830 are only examples, and each may be replaced with a different one of, for example, Ni—Cd cell, Ni-MH cell, lead acid cell, Li-ion cell, Li—Po cell, and Li—FePO4 cell.

The battery pack 800 may include a sensor (not illustrated in FIG. 8) that may be coupled with the controller 811, the switching circuit 813, and/or the plurality of battery cells. For simplicity of explanation, the sensor may be assumed to be a part of the controller 811, although the disclosure does not limit it so. When the battery pack 800 is coupled with an electronic device, such as, for example, the electronic device 201 and the electronic device 201 operates, the battery pack 800 may supply power to the electronic device 201 or receive power from the electronic device 201.

When a current from the Li-ion cell 820 is larger than or equal to a first current threshold, the controller 811 may transmit a control signal to the switching circuit 813, and the switching circuit 813 may terminate the connection with the Li-ion cell 820 and configure a connection with the Ni—Cd cell 830.

Accordingly, the controller 811 may measure the current from the Li-ion cell 820 and compare it with a predetermined first current threshold. The first current threshold may be, for example, 1000 mA. When the current from the Li-ion cell 820 is larger than or equal to 1000 mA, the controller 811 may determine that the electronic device 201, which operates with power from the battery pack 800, is drawing a lot of current and therefore sends control signal to the switching circuit 813 for battery cell switching.

When the switching circuit 813 receives the control signal, the switching circuit 813 may terminate the connection with the Li-ion cell 820 and configure a connection with the Ni—Cd cell 830. As a result, the Ni—Cd cell 830, which may handle demand for high current output better than the Li-ion cell 820, is now configured to provide power to the electronic device 201, thereby more efficiently using the battery pack 800.

Thereafter, controller 811 may compare the current from the Ni—Cd cell 830 with the predetermined first current threshold, which may be 1000 mA. When the discharge current of the Ni—Cd cell 830 is smaller than 1000 mA, the controller 811 may determine that because the electronic device 201 is operating with relatively small power consumption or even in a standby mode rather than an active operation mode, the power can be sourced by the Li-ion cell 820. Accordingly, a control signal for battery cell switching may be sent by the controller 811 to the switching circuit 813.

When the switching circuit 813 receives the control signal, the switching circuit 813 may terminate the connection with the Ni—Cd cell 830 and configure a connection with the Li-ion cell 820. In other words, when the current from the Ni—Cd cell 830 is smaller than 1000 mA, the Li-ion cell 820 may be used because it may be more favorable for current output smaller than 1000 mA than the Ni—Cd cell 830 based on characteristics such as the capacity increase efficiency and the self-discharge rate.

The controller 811 may also use a voltage level of the cell configured to source power (or discharge) to the electronic device 201 to determine whether it has enough power to allow the electronic device 201 to operate properly. For example, if the Ni—Cd cell 830 is configured to supply power to the electronic device 201, the controller 811 may measure a voltage (V_BAT_02) of the Ni—Cd cell 830, and the controller 811 may compare the voltage (V_BAT_02) of the Ni—Cd cell 830 with a predetermined first voltage threshold. For example, the first voltage threshold may be 3.35 V. When the voltage (V_BAT_02) of the Ni—Cd cell 830 is larger than or equal to 3.35 V, the Ni—Cd cell 830 may still be used. In contrast, when the voltage (V_BAT_02) of the Ni—Cd cell 830 is smaller than 3.35 V, the controller 811 may determine that the Ni—Cd cell 830 does not have enough capacity for operating the electronic device 201. The controller 811 may then transmit a control signal to the switching circuit 813 to switch from the Ni—Cd cell 830 to the Li-ion cell 820. The switching circuit 813 may then terminate the connection with the Ni—Cd cell 830 and configure a connection with the Li-ion cell 820.

Similarly, when the Li-ion cell 820 is sourcing power for the electronic device 201, the controller 811 may also measure a voltage (V_BAT_01) of the Li-ion cell 820. The controller 811 may compare the voltage (V_BAT_01) of the Li-ion cell 820 with the first voltage threshold of 3.35 V. When the voltage (V_BAT_01) of the Li-ion cell 820 is larger than or equal to 3.35 V, the Li-ion cell 820 can be still used. In contrast, when the voltage (V_BAT_01) of the Li-ion cell 820 is smaller than 3.35 V, the controller 811 may determine that the Li-ion cell 820 is at a low battery state and needs to switch to another cell that is not in a low battery state.

According to another embodiment of the present disclosure, the switching circuit 813 may have initially configured the Li-ion cell 820 to be charged by an external charging device (not shown) coupled with the battery pack. At this time, the controller 811 may measure the charging current to the Li-ion cell 820.

The controller 811 may compare the charging current to the Li-ion cell 820 with a predetermined second current threshold. The second current threshold may be predetermined to be, for example, 1000 mA. When the current to the Li-ion cell 820 is larger than or equal to 1000 mA, the controller 811 may determine that quick charging is being performed by the external charging device, and transmit a control signal for battery cell switching to the switching circuit 813. This may be because the Ni—Cd cell 830 is better suited for quick charging because of its high maximum load current. Accordingly, the Ni—Cd cell 830 that is better suited for quick charging may be quick charged first, thereby improving efficiency of the use of the battery.

In this case, before transmitting the control signal, the controller 811 may identify whether the Ni—Cd cell 830 is completely charged. If the Ni—Cd cell 830 is completely charged, the Li-ion cell 820 can continue to charge without cell switching. When the Ni—Cd cell 830 is not completely charged, the control signal may be transmitted to the switching circuit 813 as described above.

When the switching circuit 813 receives the control signal, the switching circuit 813 may terminate the connection with the Li-ion cell 820 and configure a connection with the Ni—Cd cell 830. As a result, the Ni—Cd cell 830, which is more conducive to quick charging due to the higher maximum load current, can be charged by switching from the Li-ion cell 820 to the Ni—Cd cell 830, thereby improving efficiency of the use of the battery.

When the Ni—Cd cell 830 is charged by the external charging device, the sensor may measure the voltage (V_BAT_02) of the Ni—Cd cell 830. The controller 811 may then compare the voltage (V_BAT_02) of the Ni—Cd cell 830 with a predetermined second voltage threshold of, for example, 4.3 V. When the voltage (V_BAT_02) of the Ni—Cd cell 830 is smaller than 4.3 V, the controller 811 may determine that the Ni—Cd cell 830 is not completely charged and the Ni—Cd cell 830 can continue to be charged. In contrast, when the voltage (V_BAT_02) of the Ni—Cd cell 830 is larger than or equal to 4.3 V, the controller 811 may determine that the Ni—Cd cell 830 is completely charged and may remove the charging current.

Thereafter, the controller 811 may additionally identify whether the Li-ion cell 820 is completely charged. When the Li-ion cell 820 is completely charged, the controller 811 may determine that all battery cells are completely charged. When the Li-ion cell 820 is not completely charged, the controller 811 may transmit to the switching circuit 813 the control signal for switching from the Ni—Cd cell 830 to the Li-ion cell 820, and the switching circuit 813 may terminate the connection with the Ni—Cd cell 830 and then configure a connection with the Li-ion cell 820.

According to the aforementioned processes, when the connection with the Li-ion cell 820 is configured, if the charging current for the Li-ion cell 820 is smaller than a second current threshold, the Li-ion cell 820 may be charged by the external charging device. Thereafter, the controller 811 may measure the voltage (V_BAT_01) of the Li-ion cell 820, and the controller 811 may compare the voltage (V_BAT_01) of the Li-ion cell 820 measured by the sensor with the predetermined second voltage threshold of, for example, 4.3 V. When the voltage (V_BAT_01) of the Li-ion cell 820 is smaller than 4.3 V, the controller 811 may determine that the Li-ion cell 820 is not completely charged and the Li-ion cell 820 can be still charged. When the voltage (V_BAT_01) of the Li-ion cell 820 is larger than or equal to 4.3V, the controller 811 may determine that the Li-ion cell 820 is completely charged.

The battery pack 800 may be a part of the electronic device 201 or it may be an external battery pack that provides power to the electronic device 201.

Figure 9:
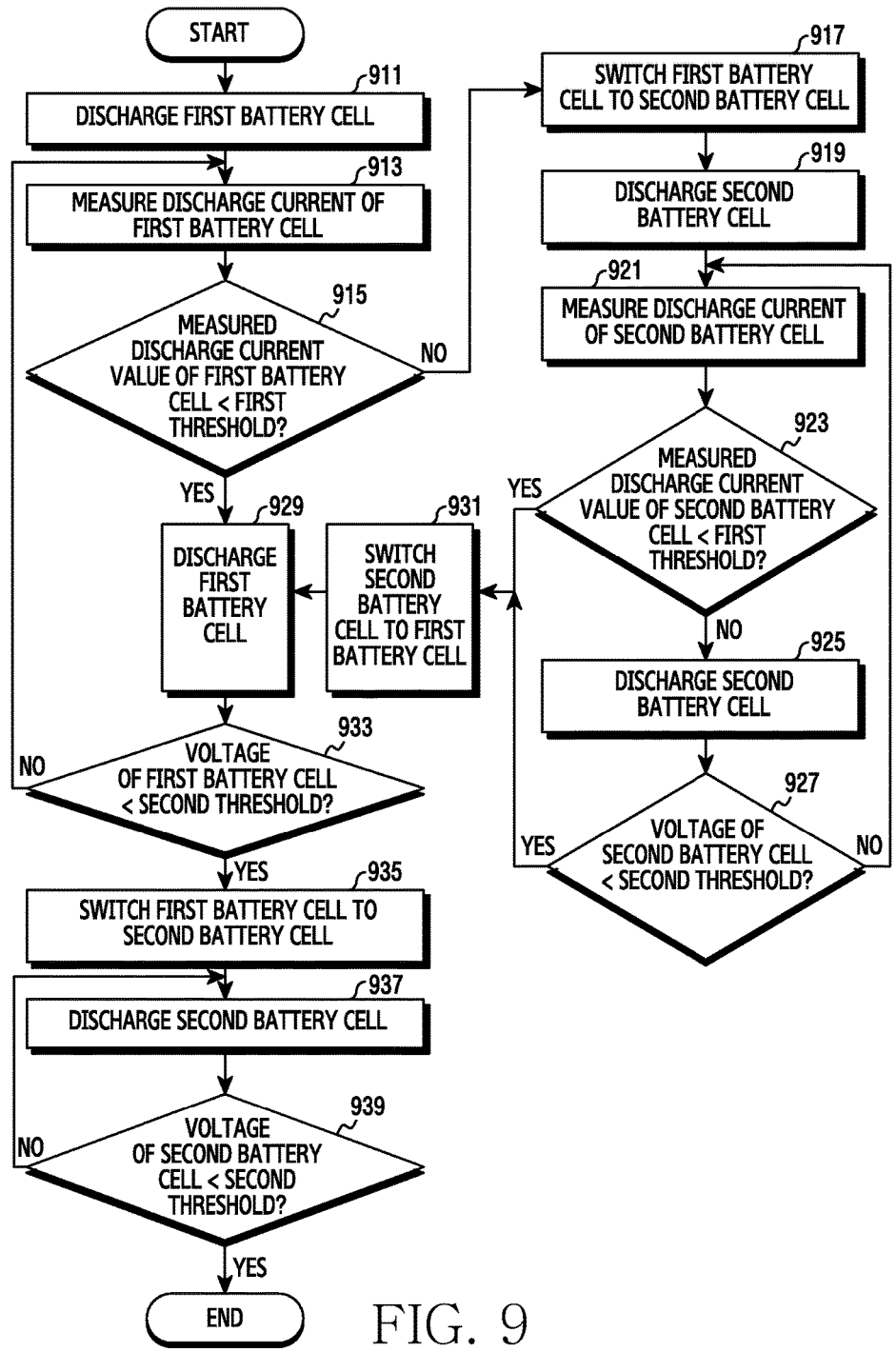
FIG. 9 is a flowchart illustrating management of a battery according to various embodiments of the present disclosure.

FIG. 9 is a flowchart illustrating management of a battery according to various embodiments of the present disclosure.

Referring to FIG. 9, the operation of a battery pack with a plurality of battery cells and PCM may provide power to an electronic device. The PCM may comprise a switching circuit that selects one of the plurality of battery cells to provide power to the electronic device coupled to the battery pack. The PCM may also comprise a controller that may measure current and voltage at various nodes of the battery pack via a sensor, and also provide commands to the switching circuit. However, the present disclosure does not limit the sensor to being a part of the controller, but only describes it as such for ease of explanation.

The switching circuit according to an embodiment of the present disclosure may be coupled with a first battery cell. As a result, the first battery cell may discharge (provide power) to an external electronic device, which operates while being coupled with the battery pack in step 911. In this case, the first battery cell may be one of, for example, a Ni—Cd battery, a Ni-MH battery, a lead acid battery, a Li-ion battery, a Li—Po battery, and a Li—FePO4 battery.

In step 913, the sensor may measure a current from the first battery cell.

In step 915, the controller may compare the measured current from the first battery cell with a first threshold. In this case, the first threshold may be a predetermined value. When the measured current is smaller than the first threshold, the first battery cell may still provide power in step 929.

In contrast, when the current from the first battery cell is larger than or equal to the first threshold, the controller may determine that the external electronic device operates with relatively large power consumption, and transmits a control signal to the switching circuit to switch from the first battery cell to a second battery cell.

After receiving the control signal from the controller, the switching circuit may terminate the connection with the first battery cell and configure a connection with a second battery cell of a different type from the first battery cell in step 917.

In this case, the second battery cell may be, for example, a Ni—Cd battery. In other words, when the discharge current of the first battery cell is larger than or equal to the first threshold, it may be determined that the external electronic device operates with relatively large power consumption. As a result, the Ni—Cd battery, which is favorable for the operation of the external electronic device with large power consumption due to a high maximum load current, can be used by switching from the first battery cell to the second battery cell, thereby improving efficiency of the use of the battery.

In step 919, the second battery cell may provide power for the operation of the external electronic device.

The sensor may measure current from the second battery cell in step 921, and the controller may compare the measured current from the second battery cell with a predetermined first threshold in step 923. The first threshold may be determined as a predetermined value. At this time, when the discharge current is larger than or equal to the first threshold, it may be determined that the external electronic device still operates with relatively large power consumption. As a result, the second battery cell may still provide power in step 925.

In step 927, the sensor may measure a voltage of the second battery cell, and the controller may compare the measured voltage of the second battery cell with a predetermined second threshold. When the voltage of the second battery cell is larger than or equal to the second threshold, the controller may determine that the second battery cell is not completely discharged and proceed to step 921.

In contrast, when the measured current from the second battery cell is smaller than the first threshold in step 923 or when the voltage of the second battery cell is smaller than the second threshold in step 927, the controller transmits a control signal to the switching circuit in step 931 to switch from the second battery cell to the first battery cell, and the switching circuit may terminate the connection with the second battery cell and configure the connection with the first battery cell, which is a different type from the second battery cell.

The first battery cell may provide power in step 929, and the sensor may measure a voltage of the first battery cell and the controller may compare the measured voltage of the first battery cell with the second threshold in step 933. When the voltage of the first battery cell is larger than or equal to the second threshold, the controller may determine that the first battery cell is not completely discharged and proceeds to step 913.

In contrast, when the controller determines that the measured voltage of the first battery cell is smaller than the second threshold in step 933, the controller may transmit to the switching circuit a control signal for switching from the first battery cell to the second battery cell in step 935, and the switching circuit may terminate the connection with the first battery cell and configure a connection with the second battery cell, which is a different type than the first battery cell.

Thereafter, the second battery cell may be discharged in step 937, and the sensor may measure a voltage of the second battery cell and the controller may compare the measured voltage of the second battery cell with the second threshold in step 939. When the voltage of the second battery cell is larger than or equal to the second threshold, the controller may determine that the second battery cell is not completely discharged and proceed to step 937. When the voltage of the second battery cell is smaller than the second threshold, the controller may determine that all battery cells are completely discharged and all processes may end.

Figure 10:
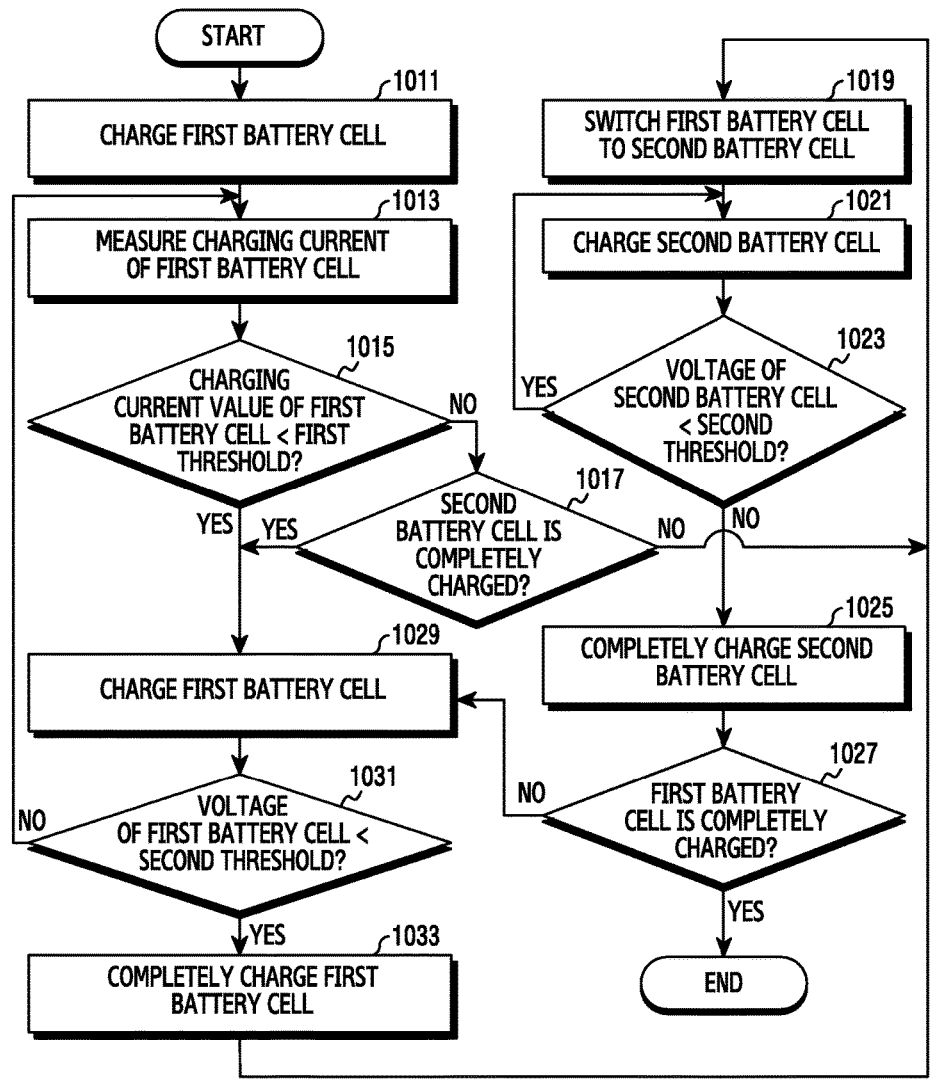
FIG. 10 is a flowchart illustrating management of a battery according to various embodiments of the present disclosure.

FIG. 10 is a flowchart illustrating management of a battery pack according to various embodiments of the present disclosure.

Referring to FIG. 10, the operation of a battery pack with a plurality of battery cells and PCM may provide power to an electronic device. In FIG. 10, the specific example will be that of the battery cells being charged by an external charger. The PCM may comprise a switching circuit that selects one of the plurality of battery cells to receive power from the external charger coupled to the battery pack. The PCM may also comprise a controller that may measure current and voltage at various nodes of the battery pack via a sensor, and also provide commands to the switching circuit. However, the present disclosure does not limit the sensor to being a part of the controller, but only describes it as such for ease of explanation.

The switching circuit according to an embodiment of the present disclosure may be coupled with a first battery cell. As a result, the first battery cell may be charged by an external charger, which is coupled with a battery pack in step 1011. In this case, the first battery cell may be, for example, one of a Ni—Cd battery, a Ni-MH battery, a lead acid battery, a Li-ion battery, a Li—Po battery, and a Li—FePO4 battery.

In step 1013, the sensor may measure a charging current to the first battery cell.

In step 1015, the controller may compare the charging current to the first battery cell with a predetermined first threshold.

When the charging current to the first battery cell is smaller than the first threshold, the first battery cell may be still charged in step 1029.

In contrast, when the charging current to the first battery cell is larger than or equal to the first threshold, the controller may identify whether a second battery cell is completely charged in step 1017. When the second battery cell is identified as completely charged, the first battery cell may be charged in step 1029 since the battery cell switching is not needed. When the second battery cell is not completely charged, the controller may determine that quick charging is being performed by the external charger since the charging current to the first battery cell is larger than or equal to the first threshold. Thereafter, the controller may transmit a control signal for battery cell switching to the switching circuit. When the switching circuit receives the control signal, the switching circuit may terminate the connection with the first battery cell and configure a connection with the second battery cell, which is a different type from the first battery cell.

In step 1021, the second battery cell may be charged by the external charger coupled with the battery pack.

The controller may compare a voltage of the second battery cell measured by the sensor with a predetermined second threshold in step 1023. When the voltage of the second battery cell is smaller than the second threshold, the controller may determine that the second battery cell is not completely charged and the second battery cell may be still charged in step 1021.

In contrast, when the voltage of the second battery cell is larger than or equal to the second threshold in step 1023, the controller may determine that the second battery cell is completely charged in step 1025.

The controller may identify whether the first battery cell is completely charged in step 1027. When the first battery cell is completely charged, the controller may determine that all battery cells are completely charged.

In contrast, when the first battery cell is not completely charged, the first battery cell may be charged in step 1029. The controller may compare the voltage of the first battery cell measured by the sensor with a predetermined second threshold in step 1031. When the voltage of the first battery cell is smaller than the second threshold, the controller may determine that the first battery cell is not completely charged and proceed to step 1013 to charge the second battery cell.

In contrast, when the voltage of the first battery cell is larger than or equal to the second threshold, the controller may determine that the first battery cell is completely charged in step 1033, and proceed to step 1019 and pass through the process identical to the aforementioned steps to determine that all battery cells are completely charged.

Figure 11:
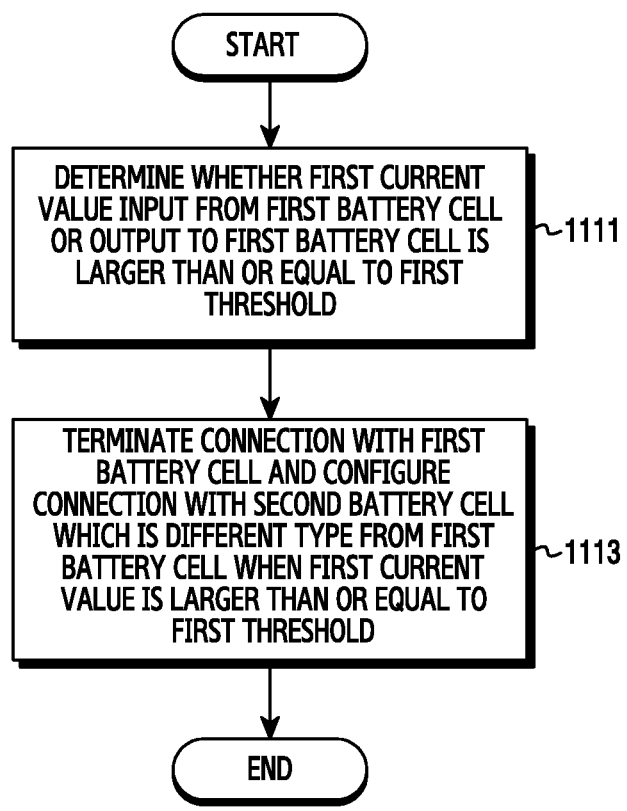
FIG. 11 is a flowchart illustrating management of a battery according to various embodiments of the present disclosure.

FIG. 11 is a flowchart illustrating management of a battery pack according to various embodiments of the present disclosure. The battery pack may comprise individual battery cells and a PCM, where the PCM comprises a controller and a switching circuit.

The controller may determine whether a first current to/from a first battery cell is larger than or equal to a first threshold in step 1111. In this case, the first battery cell may be, for example, one of a Ni—Cd battery, a Ni-MH battery, a lead acid battery, a Li-ion battery, a Li—Po battery, and a Li—FePO4 battery. The first threshold may be predetermined as, for example, 1000 mA.

In step 1113, the switching circuit may terminate the connection with the first battery cell and configure a connection with a second battery cell, which is a different type from the first battery cell, when the first current is larger than or equal to the first threshold. Similarly, the second battery cell may be, for example, one of a Ni—Cd battery, a Ni-MH battery, a lead acid battery, a Li-ion battery, a Li—Po battery, and a Li—FePO4 battery, but the type of the first battery cell is different than the type of the second battery cell.

Note that the first threshold described in FIGS. 9-11 may not necessarily have the same values for each figure, and also the second threshold described in FIGS. 9-11 may not necessarily have the same values for each figure. Flow diagrams depicted in FIGS. 9-11 are examples of processes and do not limit the present disclosure. Various other implementations may be flow diagrammed to reflect other processes according to various embodiments of the present disclosure.

The embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

For example, while various embodiments of the disclosure described a single battery cell of one type, the disclosure does not limit it so. Other embodiments may comprise a battery pack that has multiple batteries, with each battery having multiple battery cells of the same type. Accordingly, with respect to FIG. 7, the first battery cell 720 may be a battery comprising Li-ion battery cells. Similarly, the second battery cell 720 may be a battery comprising Ni—Cd battery cells.

The term "module" as used herein may, for example, mean a unit including one of hardware, software, and firmware or a combination of them. The "module" may be interchangeably used with, for example, the term "unit,"

"logic," "logical block," "component," or "circuit." The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments of the disclosure, at least some of the devices (e.g., modules or functions thereof) or the method (e.g., operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), etc. In addition, the program instructions may include high level language codes, which can be executed in a computer by using an interpreter, as well as machine codes made by a compiler.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Furthermore, some operations may be executed according to another order or may be omitted, or other operations may be added.

What is claimed is:

1. A battery pack, comprising:
  a first battery cell of a first battery type;
  a second battery cell of a second battery type distinct from the first battery type, wherein the second battery cell is usable for supplying a higher current than the first battery cell;
  a processor; and
  a switching circuit configured to connect the processor with one of the first battery cell and the second battery cell,
  wherein processor is configured to:
    receive, in a state where the processor is connected with the first battery cell through the switching circuit, a first current provided to an external device;
    while providing the first current to the external device, measure the first current;
    identify that the first current is equal to or higher than a threshold current;
    in response to the identification, control the switching circuit to connect the processor with the second battery cell; and
    receive, in another state where the processor is connected with the second battery cell through the switching circuit, a second current to be provided to the external device.

2. The battery pack of claim 1, wherein the processor is configured to control the switching circuit to terminate a connection between the first battery cell and the processor and connect the processor with the second battery cell when the first current is equal to or greater than the threshold current.

3. The battery pack of claim 1, wherein the processor is further configured to:
  while providing the second current to the external device, measure the second current; and
  control the switching circuit to terminate a connection between the second battery cell and the processor and connect the first battery cell with the processor when the second current is smaller than the threshold current.

4. The battery pack of claim 1, wherein the processor is further configured to control the switching circuit to terminate a connection between the second battery cell and the processor and connect the first battery cell with the processor when a second voltage of the second battery cell is smaller than a threshold voltage.

5. The battery pack of claim 4, wherein the processor is further configured to determine that the first battery cell and the second battery cell are to be charged when a first voltage of the first battery cell is smaller than the threshold voltage.

6. The battery pack of claim 1, wherein, the processor is further configured to control the switching circuit to terminate a connection between the processor and the first battery cell and connect the second battery cell with the processor when a first voltage of the first battery cell is smaller than a threshold voltage.

7. The battery pack of claim 6, wherein the controller determines that the first battery cell and the second battery cell are to be charged when a second voltage of the second battery cell is smaller than the threshold voltage.

8. The battery pack of claim 1, wherein the processor is further configured to:
  identify that quick charging is performed by the external device; and
  in response to identifying that the quick charging is performed by the external device, control the switching circuit to connect the processor with the second battery cell.

9. The battery pack of claim 1, wherein the processor is further configured to:
  identify that the external device is in an active state distinct to a sleep state; and
  in response identifying that the external device is in the active state, control the switching circuit to connect the processor with the second battery cell.

10. The battery pack of claim 1, wherein the first battery cell and the second battery cell are different ones of a Ni—Cd battery type, a Ni-MH battery type, a lead acid battery type, a Li-ion battery type, a Li—Po battery type, and a Li—FePO4 battery type.

11. A method for managing a battery pack, comprising:
  connecting with a switching circuit a processor with one of a first battery cell of the first battery cell type and a second battery cell of a second battery cell type,
  receiving, by the processor, in a state where the processor is connected with the first battery cell through the switching circuit, a first current provided to an external device;

measuring, by the processor, while providing the first current to the external device, the first current;

identifying, by the processor, that the first current is equal to or higher than a threshold current;

in response to the identification, controlling, by the processor, the switching circuit to connect the processor with the second battery cell; and receiving, by the processor, in another state where the processor is connected with the second battery cell through the switching circuit, a second current to be provided to the external device.

12. The method of claim 11, further comprising:

controlling, by the processor, the switching circuit to:
terminate a connection between the first battery cell and the processor when the first current is equal to or larger than the threshold current; and
connect the second battery cell with the processor.

13. The method of claim 11, further comprising:

measuring, by the processor, the second current while providing the second current to the external device;

controlling, by the processor, the switching circuit to:
terminate a connection between the second battery cell and the processor when the second current is smaller than the threshold current; and connect the first battery cell with the processor.

14. The method of claim 11, further comprising:

controlling, by the processor, the switching circuit to:
terminate a connection between the second battery cell and the processor when the second voltage of the second battery cell is smaller than the threshold voltage; and
connect the first battery cell with the processor.

15. The method of claim 14, further comprising:

determining, by the processor, that the first battery cell and the second battery cell are to be charged when a first voltage of the first battery cell is smaller than the threshold voltage.

16. The method of claim 11, further comprising:

controlling, by the processor, the switching circuit to:
terminate a connection between the processor and the first battery cell when the measured voltage of the first battery cell is smaller than the threshold voltage; and connect the second battery cell with the processor.

17. The method of claim 16, further comprising:

determining, by the processor, that the first battery cell and the second battery cell are to be charged when a second voltage of the second battery cell is smaller than the threshold voltage.

18. The method of claim 11, further comprising:

identifying, by the processor, that quick charging is performed by the external device; and in response to identifying that the quick charging is performed by the external device, controlling, by the processor, the switching circuit to connect the processor with the second battery cell.

19. The method of claim 11, further comprising:

identifying, by the processor, that the external device is in an active state distinct to a sleep state; and in response identifying that the external device is in the active state, controlling, by the processor, the switching circuit to connect the processor with the second battery cell.

20. The method of claim 11, wherein the first battery cell and the second battery cell are different ones of a Ni—Cd battery type, a Ni-MH battery type, a lead acid battery type, a Li-ion battery type, a Li—Po battery type, and a Li—FePO4 battery type.

* * * * *